United States Patent [19]
Doemer et al.

[11] 4,355,400
[45] Oct. 19, 1982

[54] TRANSMITTING AMPLIFIER FOR A REMOTE FED INTERMEDIATE REGENERATOR

[75] Inventors: Josef Doemer, Hohenschaeftlarn; Gerhard Thanhaeuser, Mering, both of Fed. Rep. of Germany

[73] Assignee: Siemens Aktiengesellschaft, Berlin & Munich, Fed. Rep. of Germany

[21] Appl. No.: 252,300

[22] Filed: Apr. 9, 1981

[30] Foreign Application Priority Data

May 7, 1980 [DE] Fed. Rep. of Germany ....... 3017476

[51] Int. Cl.$^3$ .................. H04L 25/64; H03K 5/01
[52] U.S. Cl. .................................... 375/4; 178/70 TS; 307/265; 307/268; 328/164
[58] Field of Search .................. 178/70 R, 70 TS; 307/260, 261, 265, 268, 282; 328/164; 330/250, 290, 291, 296, 195; 358/165; 371/7, 48, 72; 375/4, 36

[56] References Cited

U.S. PATENT DOCUMENTS

| | | | |
|---|---|---|---|
| 3,818,360 | 6/1974 | Boutmy et al. | 330/195 |
| 3,965,370 | 6/1976 | Bates | 307/268 |
| 3,991,324 | 11/1976 | Venken | 307/265 |
| 4,207,436 | 6/1980 | Tosuntikool et al. | 328/164 |
| 4,255,812 | 3/1981 | Huellwegen | 178/70 R |

OTHER PUBLICATIONS

"34 Mb/s Line System 8TR 607", Philips Telecommunication Review, vol. 37, No. 3, Aug. 1979, pp. 161–169.

Primary Examiner—Benedict V. Safourek
Attorney, Agent, or Firm—Hill, Van Santen, Steadman, Chiara & Simpson

[57] ABSTRACT

A remote fed intermediate regenerator for use in transmission lines for digital signals having no direct current component has for each transmission direction a series circuit including a distortion corrector a regenerator circuit and a transmitting amplifier. For isolating the signal path and the remote feed path each intermediate regenerator is preceded and followed by remote feed dividing filters and each intermediate regenerator contains a high power Zener diode bridging the remote feed path of the regenerator and the distortion correcter and regenerator circuit each contain low power Zener diodes for stabilizing the operating voltages thereof. A transmitting amplifier for the intermediate regenerator has dynamic current characteristics and operates to stabilize the voltage without the necessity of a Zener diode and accordingly does not require a high-value input impedance thereby avoiding a significant power loss.

2 Claims, 2 Drawing Figures

Transmitting Amp.

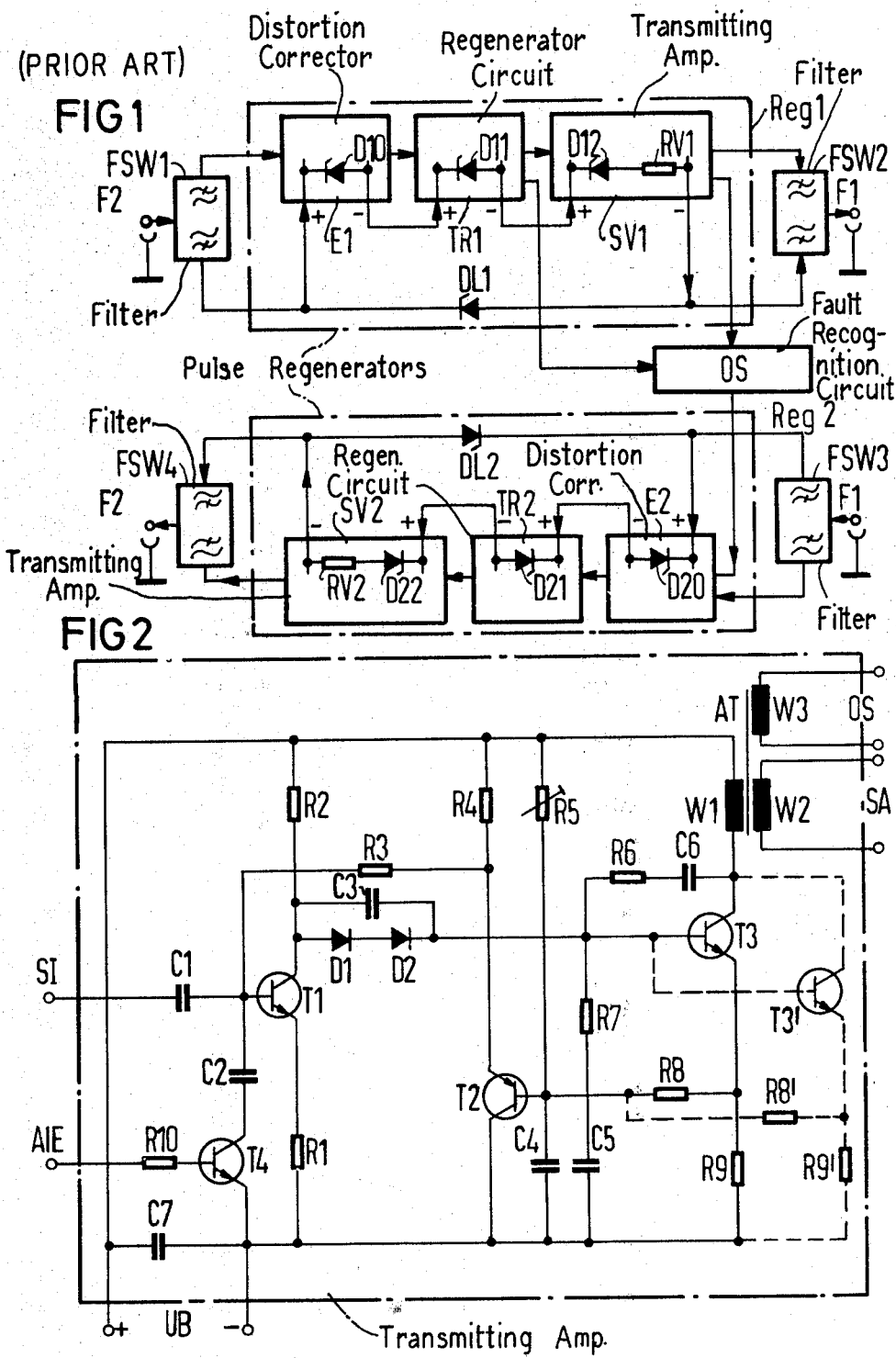

TRANSMITTING AMPLIFIER FOR A REMOTE FED INTERMEDIATE REGENERATOR

BACKGROUND OF THE INVENTION

1. Field of the Invention

The present invention relates to remote fed intermediate regenerators for use in transmission lines for digital signals and in particular to a transmitting amplifier for such a regenerator.

2. Description of the Prior Art

Remote fed intermediate regenerators for use in transmission lines for digital signals having no direct current component are known in the art which contain for each transmission direction a series circuit including a distortion correcter, a regenerator circuit and a transmitting amplifier. The intermediate regenerator is preceded and followed by remote feed dividing filters. Each intermediate regenerator for each transmission direction further contains a high power Zener diode which bridges the entire remote feed path in the intermediate regenerator and the distortion correcter, the regenerator circuit and the transmitting amplifier each contain low power Zener diodes connected in parallel to the operating voltage terminals of those components for stabilizing the operating voltages thereof.

Such intermediate regenerators serve to regenerate and attenuate the transmitted pulses which have been sent via a transmission cable and to regenerate the position of the pulses in the time pattern. For this purpose the distortion correcter, located at the input end of the regenerator, cancels the frequency response of the transmission cable and is followed in series by the actual regenerator circuit. Following the regenerator circuit, at the output end of the intermediate regenerator, a transmitting amplifier is employed for producing the output signal having an amplitude necessary for the next section of the transmission link.

The low power Zener diodes used in the individual circuits within the regenerator exhibit a noticeable Zener bend so that the dynamic resistance of these low power Zener diodes is extremely small. In the event of excess currents the low power Zener diodes would thus absorb the excess currents until the diodes were destroyed without the voltage drop necessary to operate the high power Zener diode ever being reached. For this reason, a series resistor of relatively high impedance is inserted in the remote feed path, generally in the transmitting amplifier. The operation of this series resistor is such as to generate a considerable voltage drop in the event of excess currents so that the high power Zener diode will operate before the low power Zener diodes are destroyed. The series resistor must have a specific resistance value, or higher, in order to fulfill its protective function. The magnitude of the series resistor is, however, limited by the voltage drop which occurs during normal operation and which consequently represents a circuit loss. Generation of subsidiary voltages of this type is described in the Philips Telecommunication Review, Vol. 37, No. 3, Aug. 1979 at pages 161 through 169.

It is thus a problem in the art of dimensioning the series resistor to protect the low power Zener diodes without significantly increasing the circuit loss as a result of the presence of a high impedance.

SUMMARY OF THE INVENTION

It is an object of the present invention to provide a transmitting amplifier for a pulse regenerator which is voltage stabilized by dynamic operation resembling a resistor without the necessity of the use of a Zener diode.

The above object is inventively achieved in a continuous amplifier which does not require a Zener diode in contrast to conventional switching amplifiers which require a Zener diode during the pulse intervals to absorb the current required for pulse transmission. A particular advantage of the present invention is that Zener diodes having an extremely sharp Zener curve can be used to stablize the operating voltages of the distortion correcting means and the regenerator circuit, so that the operation of those circuits is to a high degree decoupled from fluctuations in the feed current. A further advantage of the present invention is the use of a push-push output transformer in place of a push-pull transformer which, in particular at high switching speeds, can be only constructed fully symmetrically with difficulty. Another advantage of the present invention is the need for only a low operating voltage and an output impedence, which is defined even at high frequencies, for essentially reflection-free matching to a following line.

In those systems exhibiting relatively long field lengths between the individual intermediate regenerators, a further embodiment of the inventive circuit employs an additional transistor which is connected in parallel across an output-side transistor.

DESCRIPTION OF THE DRAWINGS

FIG. 1 is a schematic circuit diagram of a remote fed PCM regenerator of a known type.

FIG. 2 is a circuit diagram of a transmitting amplifier constructed in accordance with the principles of the present invention which can be employed in the prior art device of FIG. 1.

DESCRIPTION OF THE PREFERRED EMBODIMENTS

A conventional intermediate regenerator is schematically represented in FIG. 1 which includes a first regenerator Reg1 for transmission in the direction from F2 to F1, and a second pulse regenerator Reg2 for transmission in the direction F1 to F2. Each of the two pulse regenerators Reg1 and Reg2 contains a distortion correcting means, referenced at E1 and E2, a regenerator circuit referenced at TR1 and TR2 and a transmitting amplifier referenced at SV1 and SV2. All components within each pulse regenerator are arranged in series in this sequence in the signal path. The regenerator circuit TR1 and the transmitting amplifier SV1 for one of the transmitting directions are also connected to inputs of a fault recognition circuit or loop OS which is a part of the intermediate regenerator and the output of the fault recognition circuit OS is connected to an input of the distortion correcting means E2 belonging to the pulse regenerator for the opposite direction.

The current supply to the intermediate regenerators is provided by remote feed via the transmission cable, and the remote feed current is supplied to the remote feed section at the cable terminal for one transmission direction, passes through that remote feed section until reaching the end thereof, and is coupled in the opposite direction and flows back through the cable and the intermediate regenerators in the opposite direction to the feed position. For isolation of the signal path and the remote feed path, the intermediate regenerators contain remote feed dividing filters FSW1 and FSW3 which at the receiving end precede the pulse regenerators and isolate the remote feed current and the transmission signal from one another. At the output end similar dividing filters FSW2 and FSW4 are provided which serve to combine the remote feed current and the emitted transmission signal.

The maximum current received by the pulse regenerators is limited by a power Zener diode DL1 in one direction and DL2 in the opposite direction which are connected between the feed terminals of the respective pulse regenerator and which, upon an ignition voltage being reached, absorb excess currents caused, for example, by external influences.

Within each pulse regenerator it is possible to connect the distortion correcting means, the regenerator circuit and the transmitting amplifier in parallel and to split the remote feed current into corresponding components. Such a parallel construction may be used when, because of the link design, a comparatively high remote feed current is available whereas the voltage available to each regenerator is comparatively low.

The series arrangement of the distortion correcting means, the regenerator circuit and the transmitting amplifier as shown in FIG. 1 is employed when the available remote feed current is low whereas the remote feed voltage available to each regenerator is comparatively high. In such a situation, the subsidiary voltages across the individual circuits are stabilized by Zener diodes of comparatively low power, referenced at D10, D11, D12, D20, D21 and D22. In comparison to the power Zener diodes DL1 and DL2, the low power Zener diodes exhibit a noticeable Zener bend so that the dynamic resistance of the Zener diodes is extremely small. In the event of excess currents the low power Zener diodes would thus absorb the excess currents until the diodes were destroyed without the voltage drop necessary for bringing the power Zener diodes DL1 and DL2 into operation ever being reached. For this reason, a series resistance RV1 and RV2 is interconnected in the remote feed path for each pulse regenerator so that in the event of excess currents a considerable voltage drop occurs across the resistor RV1 or RV2 and results in the ignition of the respective power Zener diode DL1 or DL2. A series resistor of this kind can only fulfill its protective function if it has a specific resistance value or larger. The magnitude of the series resistor is, however, limited by the voltage drop which occurs in normal operation and which is of course not available to the circuit and so represents a circuit loss.

A transmitting amplifier for use in devices such as the prior art device shown in FIG. 1 is represented in FIG. 2 which does not require the use of a low power Zener diode for voltage stabilization and accordingly does not require the large-value protective resistance which results in significant power loss in conventional devices. The transmitting amplifier shown in FIG. 2 has characteristics of current consumption which are close to those of a resistor during dynamic operations.

The two-stage transmitting amplifier shown in FIG. 2 has an input stage which includes a first npn transistor T1 having a base terminal which is connected to a first capacitor C1 to the signal input SI. The emitter terminal of the first transistor T1 is connected to a first resistor R1 to a terminal for the negative operating voltage −UB, and the collector terminal of the first transistor T1 is connected to a second resistor R2 to the terminal for the positive operating voltage +UB. The collector terminal is further connected to the base terminal of a third transistor T3, also an npn transistor, through a diode series circuit consisting of two diodes D1 and D2 and which is bridged by a third capacitor C3.

The base terminal of the first transistor T1 is connected to a third resistor R3 to the emitter terminal of a second transistor T2, which is a pnp transistor, and is connected to the collector terminal of a fourth transistor T4 through a second capacitor C2. The fourth transistor T4 is an npn transistor. The emitter terminal of the fourth transistor T4 is connected to the negative operative voltage −UB, and the base terminal of the fourth transistor T4 is connected through a tenth resistor R10 to an input AIE for blanking pulses. The emitter terminal of the second transistor T2 is connected through a fourth resistor R4 to the positive operating voltage terminal and the collector terminal of the transistor T2 is connected directly to the negative operating voltage terminal. The base of the transistor T2 is connected to the negative operating voltage −UB through a fourth capacitor C4. The base terminal of the second transistor T2 is also connected through an adjustable fifth resistor R5 to the positive operating voltage terminal and is connected through an eighth resistor R8 to the emitter terminal of the third transistor T3. The emitter terminal of the third transistor T3 is additionally connected through a ninth resistor R9 to the negative operating voltage terminal. The base terminal of the third transistor T3 is connected through a series arrangement of a fifth capacitor C5 and a seventh resistor R7 to the negative operating voltage terminal. The emitter and collector of the third transistor T3 are connected through a further series arrangement of a sixth capacitor C6 and a sixth resistor R6. The collector terminal of the third transistor T3 is also connected to one terminal of the primary winding W1 of an output transformer AT. The other terminal of the primary winding W1 is connected to positive operating voltage terminal. The output transformer AT has a first secondary winding W2 which is connected to the signal output SA of the transmitting amplifier and has a second secondary winding W3 which is connected to the fault recognition circuit OS.

For higher transmitting power in those systems in which the field distance between individual intermediate regenerators is relatively large, the transmitting amplifier may be augmented by a further transistor T3' having base and collector terminals which are respectively connected to the corresponding terminals of the third transistor T3 and having an emitter terminal connected through a first additional resistor R8' to the base terminal of the second transistor T2 as well as through a further additional resistor R9' to the negative operating voltage terminal.

For filtering and bridging of the alternating voltages a seventh capacitor C7 is connected between the two operating voltage terminals.

The transmitting amplifier thus described above consists of a preliminary amplifier stage with a parallel connected stage for the gating-in of blanking pulses during a fault locating operation which, because of the low-ohmic connection between the collector and emitter which prevails at the arrival time of the pulses, requires no operating voltage and also does not require bridging of the direct current path to the collector. The amplifier further consists of an end amplifier stage and a regulating amplifier stage which serves to regulate the operating point of the preliminary amplifier stage and also of the end amplifier stage. The regulation procedure takes place in such a manner that a voltage drop which occurs across the ninth resistor R9, and which is proportional to the emitter current and thus also approximately proportional to the collector current of the third transistor T3, having been filtered through the eighth resistor R8 and the fourth capacitor C4, is fed to the base terminal of the emitter follower transistor T2 and from that transistor is emitted via the third resistor R3 to the base terminal of the first transistor T1. At this point the threshold voltage of the emitter-base diode of the first transistor T1 as well as its temperature dependency are largely compensated by the emitter follower transistor T2. This compensation results in a good temperature stability even in the event of small voltage drops across the emitter resistor R9 of the third transistor T3 which allows the end stage to be operated at as low a voltage as possible.

For further explanation of the regulation process it will be assumed that the emitter current of the third transistor T3 undergoes an increase. The associated rise in the voltage drop across the emitter resistor R9 results, through the eighth resistor R8 and the second transistor T2, and similarly through the third resistor R3, in a correspondingly higher base voltage across the first transistor T1. This results in a rise in the collector current of this transistor so that its collector voltage, as well as the base voltage, falls across the third transistor T3. The diode series circuit which is bridged by the third capacitor C3 serves simply to match the level between the collector of the first transistor T1 and the base of the third transistor T3 so that a sufficiently high collector voltage is available for the first transistor T1.

The loop gain in this operating point regulating circuit is fundamentally governed by the ratio of the resistance values of the second resistor R2 to the first resistor R1. By varying this ratio it is possible, within certain limits, to adjust the dynamic resistance at the current supply terminals and an increase in the loop gain similarly results in an increase in this resistance. Preferably, at the time of this adjustment the dynamic resistances selected to be approximately equal to the static resistance which is determined by the quotient of the operating voltage and operating current, so that a relative change in the operating current results in an approximately equal relative change in the operative voltage. As a result, the operating point of the end stage remains in the optimum modulation range. The dimensioning of the combination of the eighth resistor R8 and the fourth capacitor C4, as well as the capacitor C7, is dependent upon the frequency range within which low frequency disturbances occur. The dimensioning is preferably such that in the frequency range of low frequency disturbances the dynamic resistance is operative at the current supply terminals, whereas in the transmission range of the amplifier the capacitor C7 forms a short circuit so that the loop gain of the regulation remains sufficiently low in order to avoid any noticeable amplification loss.

The adjustable resistor R5 serves to precisely adjust the operating voltage in the event of an impressed operating current in which a small portion of the operating voltage, which is approximately equal to the quotient of the resistors R8 and R5, is supplied to the regulating circuit. A reduction in the value of the resistor R5 results in an increase in the operating voltage in the event of an impressed operating current.

The output resistance at the end stage which is operative in the transmission range is produced by a combined current-voltage negative feedback. The current negative feedback is effected fundamentally by means of the emitter resistor R9 and the voltage negative feedback is effected by means of the voltage division between the resistor R6 and the inner resistor of the preliminary amplifier stage with the transistor T1. This inner resistance is generated by the parallel connection of the resistors R2 and R7. The capacitors C5 and C6 are selected so as to exert substantially no influence on the operation of the end stage at low frequencies, so that the operation of the end stage is determined substantially exclusively by the operating point regulation.

For increasing the power output the number of end stage transistors may be increased, in which case the influence of external deviations is reduced by the additional resistors R8' and R9'.

Other modifications and changes may be suggested by those skilled in the art however it is the intention of the inventors to embody within the patent warranted hereon all changes and modifications as reasonably and properly come within the scope of their contribution to the art.

We claim as our invention:

1. In a remote fed intermediate regenerator for use in the transmission of digital signals said intermediate regenerator having for each transmission direction at least one pulse regenerator comprising a distortion correction means and a regenerator circuit connected in series, each regenerator being preceded by a first remote feed dividing filter and followed by a second remote feed dividing filter and each pulse generator including a high power Zener diode bridging the remote feed path of said regenerator and said distortion correcting means and said regenerator circuit each containing low power Zener diodes connected in parallel with the operating voltage terminals thereof, and a fault recognition circuit interconnected between the pulse regenerators, a transmitting amplifier for each pulse regenerator connected in series with said distortion correcting means and said regenerator circuit in said remote feed path, said transmitting amplifier comprising:

a first transistor having a base connected to a signal input of said transmitting amplifier through a first capacitor and having an emitter connected through a first resistor to a negative operating voltage and having a collector connected through a second resistor to a positive operating voltage;

a second transistor having an emitter connected to the base of said first transistor through a third resistor and to said positive operating voltage through a fourth resistor, and having a collector connected to said negative operating voltage and having a base connected through an adjustable fifth resistor to said positive operating voltage and through a fourth capacitor to said negative operating voltage;

a third transistor having a base connected to the collector of said first transistor through a diode series arrangement, said diode series arrangement being bridged by a third capacitor, said third transistor having a collector connected to the base of said third transistor through a sixth resistor and a sixth capacitor, said base of said third transistor being further connected to said negative operating potential through a seventh resistor and a fifth capacitor, said third transistor further having an emitter connected to the base of said second transistor through an eighth resistor and to said negative operating voltage through a ninth resistor;

a fourth transistor having a base connected to a blanking pulse voltage through a tenth resistor and having an emitter connected to said negative operating voltage and a collector connected to the base of said first transistor through a second capacitor; and an output transformer having a primary winding connected between the collector of said third transistor and said positive operating voltage and having a first secondary winding having a tap serving as the output for said transformer and a second secondary winding connected to an input of said fault recognition circuit, said first, third and fourth transistors being npn transistors and said second transistor being a pnp transistor.

2. The transmitting amplifier of claim 1 further comprising a fifth transistor having a base and a collector connected in parallel to the base and the collector of said third transistor and having an emitter connected to the base of said second transistor through a first additional resistor and to said negative operating voltage through a second additional resistor.

* * * * *